United States Patent

Omori

(10) Patent No.: US 9,747,092 B2
(45) Date of Patent: Aug. 29, 2017

(54) SUBSTRATE PROCESSING SYSTEM AND METHOD OF INSTALLING PLC SOFTWARE

(71) Applicant: ASM IP Holding B.V., Almere (NL)

(72) Inventor: Taku Omori, Akiruno (JP)

(73) Assignee: ASM IP HOLDING B.V., Almere (NL)

( * ) Notice: Subject to any disclaimer, the term of this patent is extended or adjusted under 35 U.S.C. 154(b) by 345 days.

(21) Appl. No.: 14/711,641

(22) Filed: May 13, 2015

(65) Prior Publication Data

US 2016/0335065 A1    Nov. 17, 2016

(51) Int. Cl.
  G06F 9/445   (2006.01)
  H04L 29/08   (2006.01)
  G05B 15/02   (2006.01)
  G05B 19/042  (2006.01)

(52) U.S. Cl.
  CPC .............. *G06F 8/61* (2013.01); *G05B 15/02* (2013.01); *G05B 19/0426* (2013.01); *H04L 67/10* (2013.01); *G05B 2219/13164* (2013.01)

(58) Field of Classification Search
  CPC .. G06F 8/61; H04L 67/10; G05B 2219/13164
  USPC ....................................................... 717/178
  See application file for complete search history.

(56) References Cited

U.S. PATENT DOCUMENTS

| | | | |
|---|---|---|---|
| 6,505,341 B1* | 1/2003 | Harris | G05B 11/42 716/117 |
| 8,790,743 B1 | 7/2014 | Omori et al. | |
| 2006/0285945 A1* | 12/2006 | Hofmeister | H01L 21/67161 414/217 |
| 2009/0006831 A1* | 1/2009 | Kwong | G06F 9/4413 713/1 |
| 2009/0063709 A1* | 3/2009 | Rice | G06F 9/445 710/1 |
| 2011/0208324 A1* | 8/2011 | Fukatsu | G05B 9/03 700/7 |
| 2011/0232844 A1* | 9/2011 | Hofmeister | H01L 21/67161 156/345.31 |
| 2013/0018501 A1* | 1/2013 | Okuno | H01L 21/67253 700/112 |
| 2014/0161570 A1* | 6/2014 | Hofmeister | H01L 21/67161 414/217 |

\* cited by examiner

*Primary Examiner* — John Chavis
(74) *Attorney, Agent, or Firm* — Studebaker & Brackett PC

(57) ABSTRACT

A substrate processing system includes a main controller, a module controller connected to the main controller, the module controller controlling a device on the basis of a command from the main controller, and a programmable logic controller connected to the module controller, wherein the module controller automatically downloads, from the main controller, module controller software to be used for control of the module controller, PLC software to be used for control of the programmable logic controller, and an automatic transfer software for automatically transferring the PLC software to the programmable logic controller.

9 Claims, 4 Drawing Sheets

Comparative Example

SUBSTRATE PROCESSING SYSTEM AND METHOD OF INSTALLING PLC SOFTWARE

BACKGROUND OF THE INVENTION

Field of the Invention

The present invention relates to a substrate processing system for performing processing in a substrate and to a method of installing PLC software.

Background Art

U.S. Pat. No. 8,790,743B1 discloses a substrate processing system provided with a main unit and a module controller which communicates with the main unit and controls a process module such as an RF generator. This substrate processing system is provided with a programmable logic controller (PLC) which monitors various statuses of the RF generator.

The module controller operates by executing module controller software installed in the module controller, and the PLC operates by executing PLC software for operating the PLC. A case where both the module controller software and the PLC software are updated and a case where one of these kinds of software is updated are conceivable. For example, when the communication format of the substrate processing system is changed, both the module controller software and the PLC software must be changed.

In the substrate processing system disclosed in U.S. Pat. No. 8,790,743B1, there is a need for an operation to install the PLC software, which is performed separately from an operation to install the module controller software. In a case where module controller software and PLC software are installed separately from each other as in the above-described system, there is a possibility of occurrence of an operational error or omission of an operation. Also, when installation of one of the module controller software and the PLC software ends in failure, a "difference" occurs between versions of these kinds of software and matching cannot be attained between these kinds of software.

SUMMARY OF THE INVENTION

In view of the above-described problem, an object of the present invention is to provide a substrate processing system and a PLC software installation method capable of securing matching between module controller software and PLC software.

The features and advantages of the present invention may be summarized as follows.

According to one aspect of the present invention, a substrate processing system includes a main controller, a module controller connected to the main controller, the module controller controlling a device on the basis of a command from the main controller, and a programmable logic controller connected to the module controller, wherein the module controller automatically downloads, from the main controller, module controller software to be used for control of the module controller, PLC software to be used for control of the programmable logic controller, and an automatic transfer software for automatically transferring the PLC software to the programmable logic controller.

According to another aspect of the present invention, a method of installing PLC software, includes a downloading step in which a module controller automatically downloads, from a main controller, module controller software to be used for control of the module controller, PLC software to be used for control of a programmable logic controller, and an automatic transfer software for automatically transferring the PLC software to the programmable logic controller, and a transfer step in which when the automatic transfer software downloaded to the module controller is executed, the automatic transfer software transfers the PLC software to the programmable logic controller.

Other and further objects, features and advantages of the invention will appear more fully from the following description.

DETAILED DESCRIPTION OF THE PREFERRED EMBODIMENTS

Figure 1:
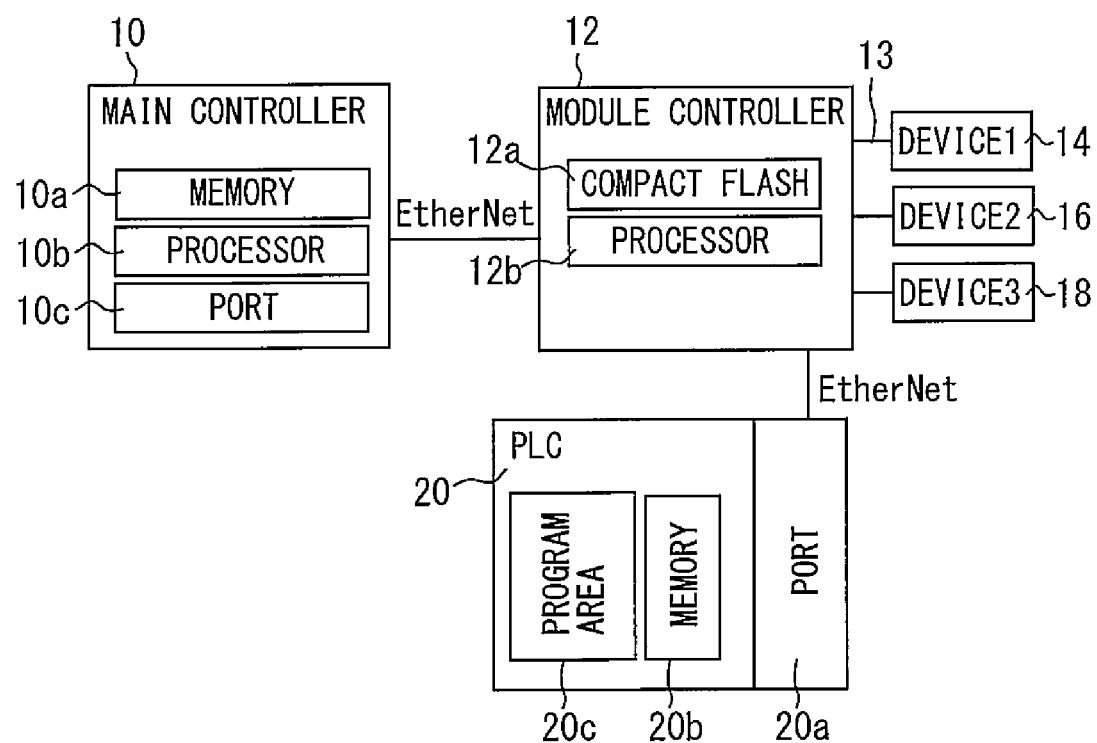
FIG. 1 is a block diagram of a substrate processing system according to a first embodiment.

A substrate processing system according to an embodiment of the present invention and a method of installing PLC software by using the substrate processing system will be described with reference to the drawings. Components identical or corresponding to each other are assigned the same reference characters and repeated description for them is omitted in some cases.

First Embodiment

FIG. 1 is a block diagram of a substrate processing system according to a first embodiment of the present invention. This substrate processing system is provided with a main controller 10 and a module controller 12. The main controller 10 is, for example, a unique platform controller (UPC). The main controller 10 is provided with a memory 10a, a processor 10b and a port 10c. The module controller 12 is a sub controller connected to the main controller 10 and controlled by the main controller 10. The module controller 12 is provided with a compact flash (trademark) 12a and a processor 12b. At the time of booting or rebooting of the module controller 12, the data stored in the compact flash 12a is initialized except predetermined partial data. This function is achieved by e.g. Enhanced Write Filter.

Devices 14, 16, and 18 are connected to the module controller 12 through an interface 13. The module controller 12 controls the devices 14, 16, and 18 on the basis of commands from the main controller 10. The devices 14, 16, and 18 are not particularly specified as long as they are used for processing on a substrate. For example, the device 14 is an RF generator for a plasma processing apparatus; the device 16 is a mass flow controller; and the device 18 is an auto pressure controller. The interface 13 is formed by Device Net from OMRON Corporation.

The module controller 12 make the devices 14, 16, and 18 process a substrate in accordance with a substrate processing procedure and recipe determined by the main controller 10.

A programmable logic controller (PLC) 20 is connected to the module controller 12. The PLC 20 is, for example, a PLC from OMRON Corporation. The PLC 20 is provided with a port 20a, a memory 20b, and a program area 20c. The program area 20c is an area in which a program is stored, and which is provided in a CPU in the PLC 20. The PLC 20 is used for logging in a plasma process. More specifically, the PLC 20 is provided for monitoring whether the plasma emission intensity of the RF generator (device 14) is within a predetermined range. The predetermined range of plasma emission intensity is designated in a process recipe for example. When the plasma emission intensity of the RF generator exceeds the predetermined range, the PLC 20 issues an alarm to the module controller 12. This alarm is reported to the main controller 10 via the module controller 12. Then, a necessary correction is made to the device for example, thereby enabling film forming with accuracy.

Figure 2:
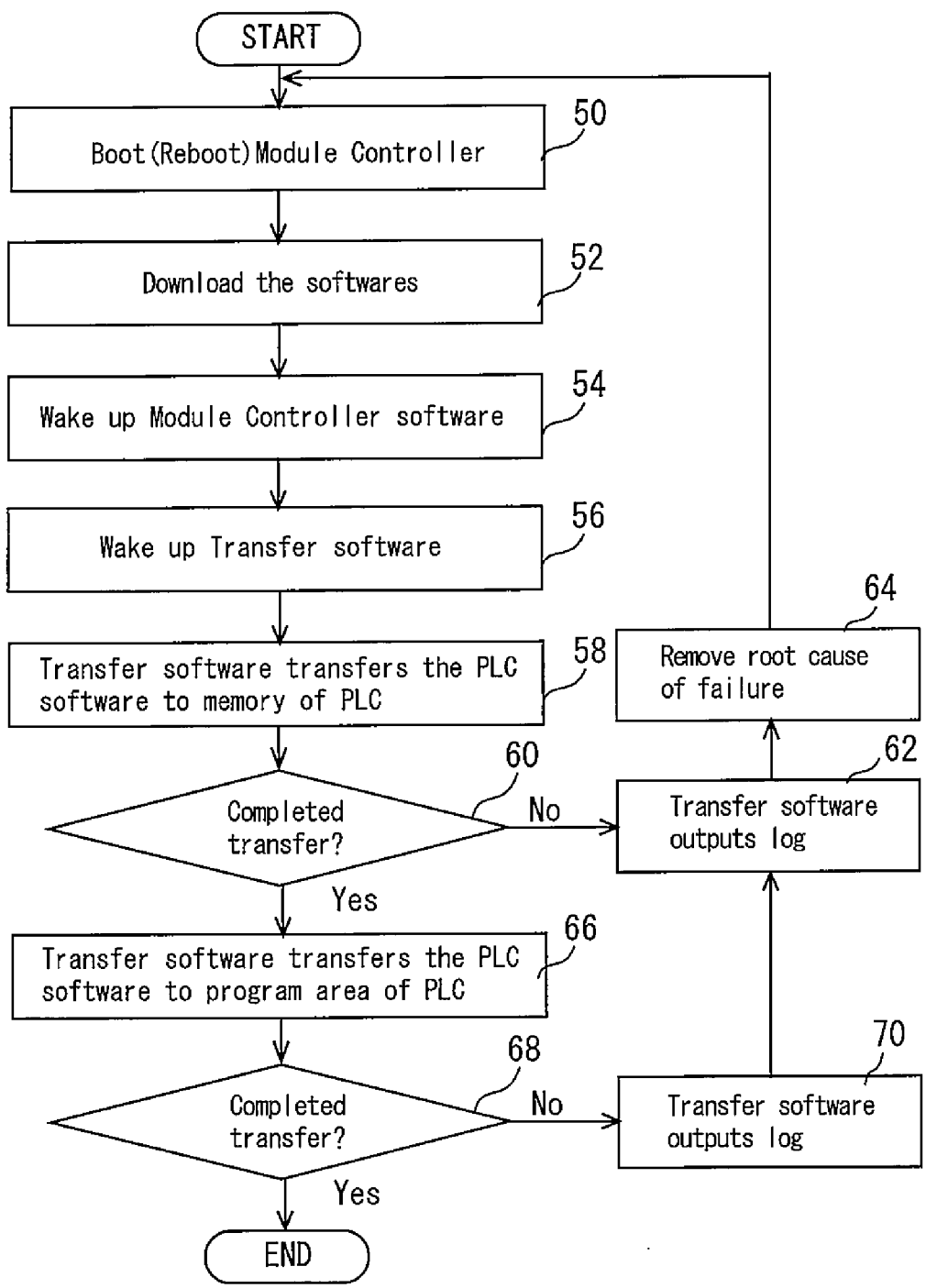
FIG. 2 is a flowchart of a PLC software installation method.

A PLC software installation method according to the embodiment of the present invention will be described with reference to the flowchart of FIG. 2. In a preparatory stage of this installation method, pieces of software are written to a predetermined folder (memory 10a) in the main controller 10. More specifically, module controller software, PLC software, and an automatic transfer software are installed in the memory 10a. The module controller software is software to be used for control of the module controller 12. The PLC software is software to be used for control of the PLC 20. The automatic transfer software is a piece of software for automatically transferring the PLC software to the PLC 20. The automatic transfer software operates on the module controller 12.

Thereafter, in step 50, the module controller 12 is booted or rebooted. Then, the module controller 12 automatically downloads the module controller software, the PLC software, and the automatic transfer software from the main controller 10. These kinds of software downloaded are stored in the compact flash 12a in the module controller 12 (step 52). This process step is referred to as "downloading step".

After the completion of the downloading step, a wake-up module (execution file) in the module controller 12 is automatically started. The wake-up module executes (starts) the module controller software and the automatic transfer software stored in the compact flash 12a (steps 54 and 56). The module controller software is sequentially executed (started) to enable the module controller 12 to control the devices, 14, 16, and 18.

When the automatic transfer software is started, the PLC software is transferred to the memory 20b (step 58). More specifically, the automatic transfer software is started to transfer the PLC software from the module controller 12 to the memory 20b by using an FTP command, which is used for file transfer through a network in accordance with Ethernet.

Subsequently, in step 60, determination is made as to whether or not this transfer has ended in success. Success or failure in this transfer is detected by the automatic transfer software. In the case of failure in the transfer, the automatic transfer software transfers a corresponding log to the module controller 12 and this log is stored as a log of the PLC 20 in the folder in the main controller 10 (step 62). For example, if no memory card is inserted in the PLC 20, and if the memory 20b itself does not exist, transfer of the PLC software by the automatic transfer software ends in failure. In this case, a corrective action to insert a memory card in the PLC 20 for example is taken (step 64) and the module controller 12 is rebooted.

If it is determined in step 60 that the transfer has ended in success, the process advances to step 66. In step 66, the PLC software transferred to the memory 20b is written to the program area 20c in the PLC 20 by the automatic transfer software. This writing is realized by the automatic transfer software issuing a special command for file transfer (FINS command). The PLC 20 is thereby enabled to execute the PLC software.

The process then advances to step 68. In step 68, success or failure in the transfer in step 66 is detected by the automatic transfer software. In the case of failure in this transfer, the automatic transfer software transfers a corresponding log to the module controller 12 and this log is stored as a log of the PLC 20 in the folder in the main controller 10 (step 70). In the case of failure in the transfer, a corrective action is taken (step 64) and the module controller 12 is rebooted. If success in the transfer in step 66 is detected, the process ends.

Thus, execution of the automatic transfer software downloaded to the module controller 12 causes the automatic transfer software to transfer the PLC software to the PLC 20. This process step is referred to as "transfer step". Installation of the PLC software is completed by completing the above-described downloading step and the transfer step.

Figure 3:
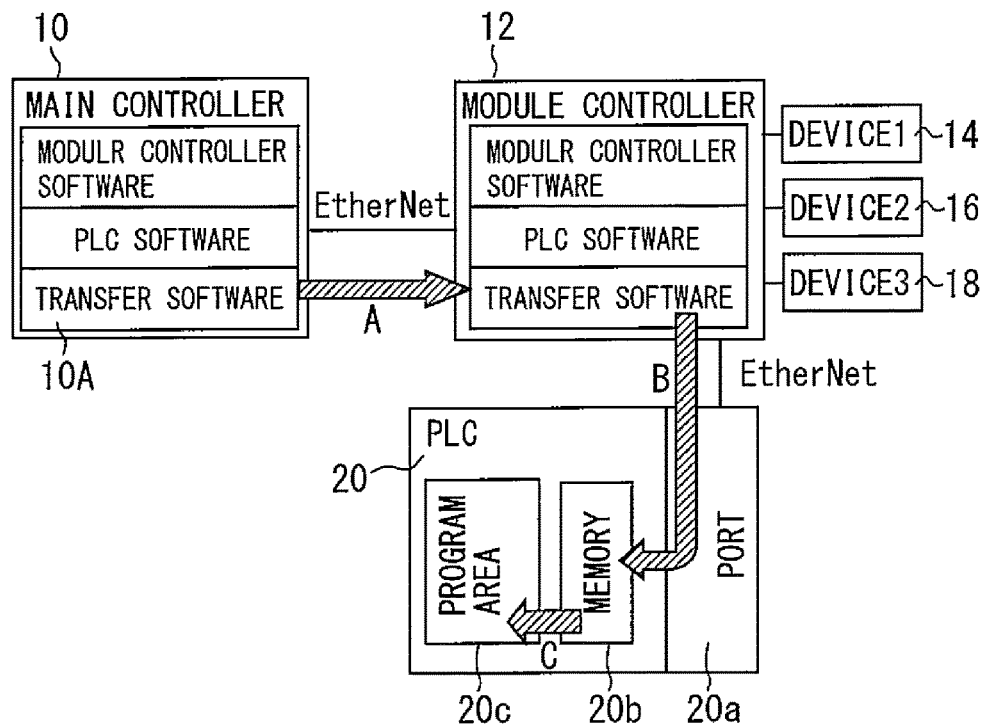
FIG. 3 is a functional block diagram of the substrate processing system according to the first embodiment.

FIG. 3 is a functional block diagram of the substrate processing system according to the first embodiment. Arrow A in FIG. 3 indicates downloading of the module controller software, the PLC software, and the automatic transfer software from the main controller 10 to the module controller 12 in the downloading step. After the downloading step, the automatic transfer software is executed in the module controller. Arrows B and C in FIG. 3 indicate transfer of the PLC software from the module controller 12 to the PLC 20 performed by the automatic transfer software in the transfer step.

Figure 4:
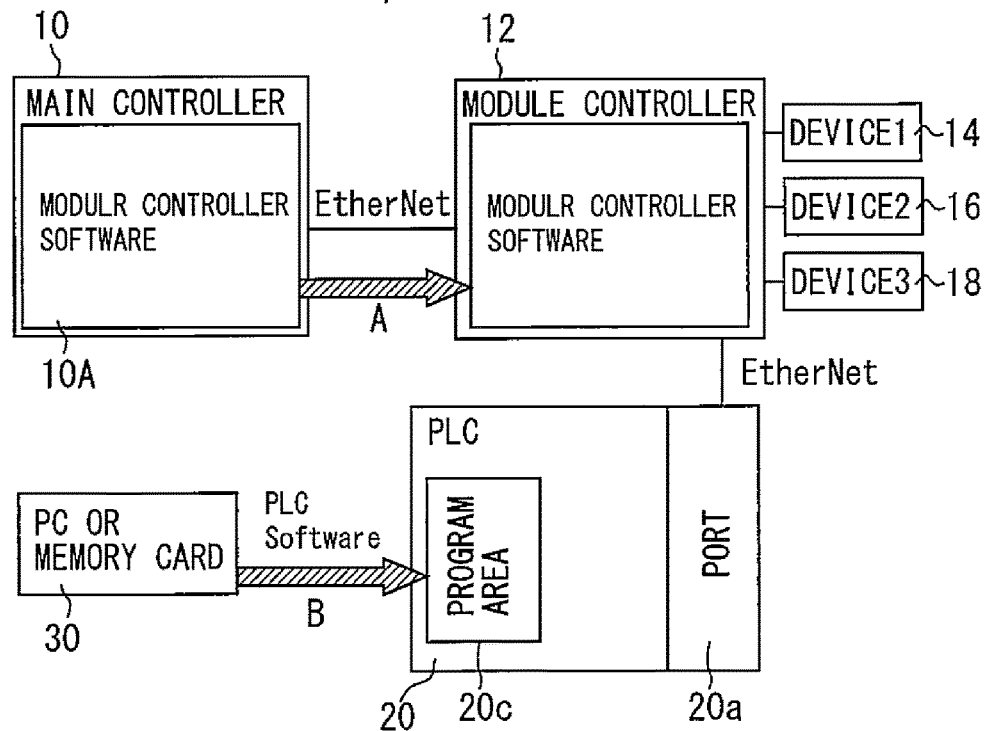
FIG. 4 is a functional block diagram of a substrate processing system according to a comparative example.

A comparative example will be described for the purpose of facilitating understanding of the features of the substrate processing system and the PLC software installation method according to the first embodiment of the present invention. FIG. 4 is a functional block diagram of a substrate processing system according to a comparative example. In the comparative example, the PLC software is installed in the PLC 20 in a process different from a process in which the module controller software is installed by the module controller 12.

At the time of booting or rebooting of the module controller 12, the module controller software is automatically downloaded from the main controller 10 to the module controller 12. The PLC software is installed in the program area 20c of the PLC 20 by using an operating PC 30. The memory 20b shown in FIG. 1 is not provided in the PLC 20 in the comparative example. In a case where the module controller software and the PLC software are separately installed as described above, there is a possibility of an operational error, omission of an operation, installation failure or the like resulting in failure to secure matching between the module controller software and the PLC software.

According to the substrate processing system and the PLC software installation method using the system according to the first embodiment of the present invention, the module controller 12 collectively downloads the module controller software, the PLC software, and the automatic transfer software from the main controller 10, and the automatic transfer software installs the PLC software to the PLC 20. As a result, matching between versions of the module controller software and the PLC software or the like can always be secured.

If transfer of the PLC software to the PLC 20 ends in failure while the automatic transfer software is executed, the automatic transfer software transfers a transfer failure log to the module controller 12. This log is sent to the main controller to enable the operator to secure matching between versions of the module controller software and the PLC software or the like by examining the cause of the transfer error, removing the cause, and again transferring the PLC software.

The substrate processing system and the PLC software installation method according to the first embodiment of the present invention can be variously modified. For example, the PLC 20 may be used to monitor various plasma statuses other than the plasma emission intensity. Further, not the plasma status but the condition of a particular one of the devices in the substrate processing system may be monitored.

The downloading step is automatically performed when the module controller 12 is started up, and the transfer step is automatically performed after the completion of the downloading step.

The automatic transfer software is assumed to transfer the PLC software to the memory 20b and to write to the program area 20c the PLC software transferred to the memory 20b. The automatic transfer software, however, may transfer the PLC software in a different process as long as it installs the PLC software in the PLC 20.

These modifications can be applied as appropriate to a substrate processing system and a PLC software installation method according to an embodiment described below. The embodiment described below has a number of commonalties with the first embodiment and will therefore be described mainly with respect to points of difference from the first embodiment.

Second Embodiment

Figure 5:
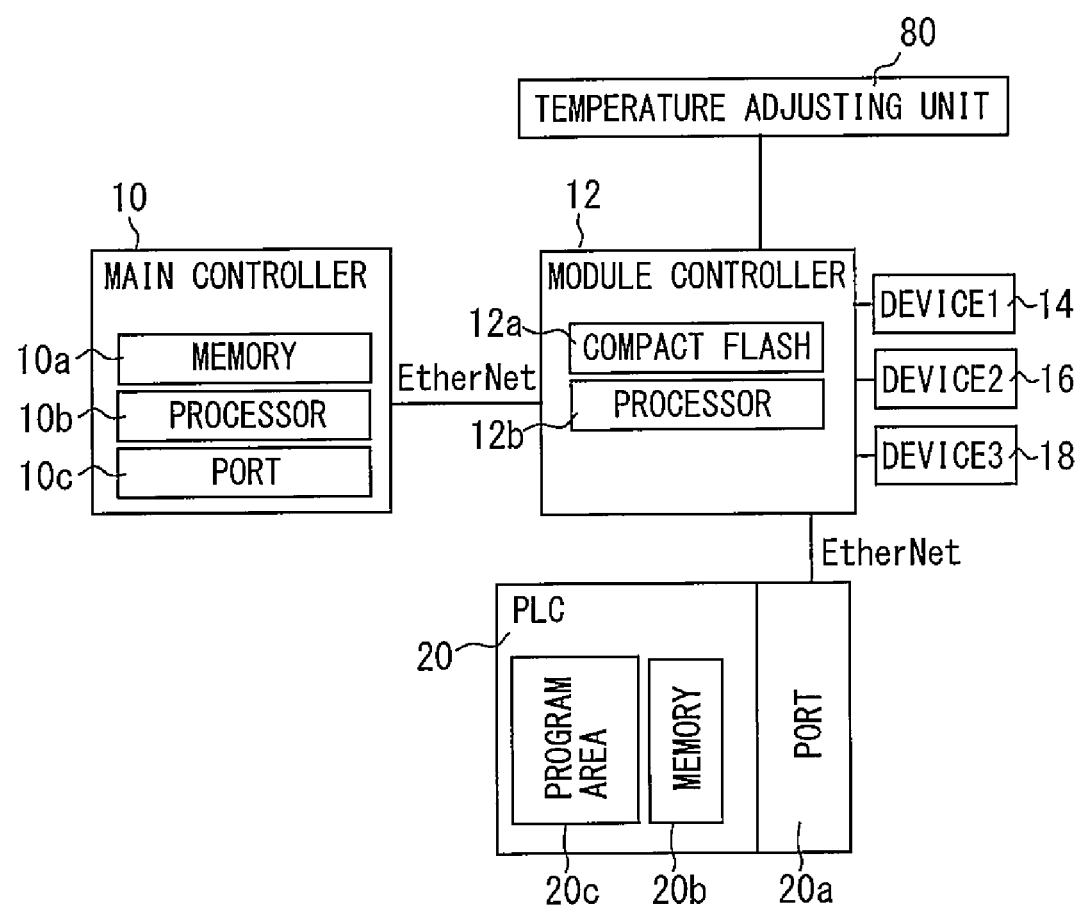
FIG. 5 is a block diagram of a substrate processing system according to the second embodiment.

FIG. 5 is block diagram of a substrate processing system according to the second embodiment. The substrate processing system is provided with a temperature adjusting unit 80 for adjusting the temperature of the susceptor heater of the plasma processing apparatus as one of devices to be controlled by the module controller 12.

In the downloading step, the module controller 12 automatically downloads from the main controller 10 the module controller software, the PLC software, the automatic transfer software, temperature adjusting configuration software to be used for control of the temperature adjusting unit 80, and a temperature adjustment automatic transfer software which automatically transfers the temperature adjusting configuration software to the temperature adjusting unit 80.

In the transfer step, the wake-up module executes the temperature adjustment automatic transfer software as well as the module controller software and the automatic transfer software. The temperature adjustment automatic transfer software transfers the temperature adjusting configuration to the temperature adjusting unit 80 via serial cable.

Thus, in the second embodiment, the PLC software is automatically transferred to the PLC 20 by the automatic transfer software and the temperature adjusting configuration software is automatically transferred to the temperature adjusting unit 80 by the temperature adjustment automatic transfer software. The module controller software, the PLC software, and the temperature adjusting configuration software can therefore be installed collectively.

According to the present invention, the module controller collectively downloads the module controller software, the PLC software, and the automatic transfer software, and the automatic transfer software installs the PLC software in the PLC. Matching between the module controller software and the PLC software can therefore be secured.

Obviously many modifications and variations of the present invention are possible in the light of the above teachings. It is therefore to be understood that within the scope of the appended claims the invention may be practiced otherwise than as specifically described.

What is claimed is:

1. A substrate processing system comprising:
   a main controller;
   a module controller connected to the main controller, the module controller controlling a device on the basis of a command from the main controller; and
   a programmable logic controller connected to the module controller,
   wherein the module controller automatically downloads, from the main controller, module controller software to be used for control of the module controller, PLC software to be used for control of the programmable logic controller, and an automatic transfer software for automatically transferring the PLC software to the programmable logic controller.

2. The substrate processing system according to claim 1, wherein the programmable logic controller has a memory and a program area, and
   wherein the automatic transfer software transfers the PLC software to the memory and writes to the program area the PLC software transferred to the memory.

3. The substrate processing system according to claim 1, wherein the module controller has a wake-up module which executes the module controller software and the automatic transfer software after the module controller downloads the module controller software, the PLC software, and the automatic transfer software.

4. The substrate processing system according to claim 1, wherein if transfer of the PLC software to the programmable logic controller ends in failure while the automatic transfer software is executed, the automatic transfer software transfers a transfer failure log to the module controller.

5. The substrate processing system according to claim 1, wherein the device is an RF generator for a plasma processing apparatus, and
   wherein the programmable logic controller monitors whether or not the plasma emission intensity of the RF generator is within a predetermined range, and issues an alarm to the module controller when the plasma emission intensity of the RF generator exceeds the predetermined range.

6. The substrate processing system according to claim 1, wherein the device has an RF generator for a plasma processing apparatus and a temperature adjusting unit for adjusting the temperature of a susceptor heater for the plasma processing apparatus, and
   wherein the module controller automatically downloads, from the main controller, the module controller software, the PLC software, the automatic transfer software, temperature adjusting configuration software to be used for control of the temperature adjusting unit, and a temperature adjustment automatic transfer software which automatically transfers the temperature adjusting configuration software to the temperature adjusting unit.

7. A method of installing PLC software, comprising:
   a downloading step in which a module controller automatically downloads, from a main controller, module controller software to be used for control of the module controller, PLC software to be used for control of a programmable logic controller, and an automatic transfer software for automatically transferring the PLC software to the programmable logic controller; and a transfer step in which when the automatic transfer software downloaded to the module controller is executed, the automatic transfer software transfers the PLC software to the programmable logic controller.

8. The method according to claim 7, wherein, in the transfer step, the automatic transfer software transfers the PLC software to a memory in the programmable logic controller, and writes to a program area in the programmable logic controller the PLC software transferred to the memory.

9. The method according to claim 7, wherein the downloading step is automatically performed at the time of startup of the module controller, and wherein the transfer step is automatically performed after the completion of the downloading step.

* * * * *